(12) United States Patent
Koch et al.

(10) Patent No.: US 11,592,835 B2
(45) Date of Patent: Feb. 28, 2023

(54) GRAPH-BASED METHOD FOR THE HOLISTIC FUSION OF MEASURED DATA

(71) Applicant: Robert Bosch GmbH, Stuttgart (DE)

(72) Inventors: Artur Koch, Waiblingen (DE); Carsten Hasberg, Ilsfeld-Auenstein (DE); Maxim Dolgov, Renningen (DE); Piyapat Saranrittichai, Korntal-Muenchingen (DE); Thomas Michalke, Weil der Stadt (DE)

(73) Assignee: Robert Bosch GmbH, Stuttgart (DE)

( * ) Notice: Subject to any disclaimer, the term of this patent is extended or adjusted under 35 U.S.C. 154(b) by 260 days.

(21) Appl. No.: 17/083,893

(22) Filed: Oct. 29, 2020

(65) Prior Publication Data

US 2021/0149417 A1    May 20, 2021

(30) Foreign Application Priority Data

Nov. 15, 2019   (DE) .......................... 102019217648.8

(51) Int. Cl.
*G05D 1/02* (2020.01)
*G05D 1/00* (2006.01)
(Continued)

(52) U.S. Cl.
CPC ......... *G05D 1/0287* (2013.01); *B60W 60/001* (2020.02); *G05D 1/0088* (2013.01);
(Continued)

(58) Field of Classification Search
CPC ........ G08G 1/161; G08G 1/22; G05D 1/0088; G05D 1/028; G05D 1/0287;
(Continued)

(56) References Cited

U.S. PATENT DOCUMENTS

| 2008/0059050 A1* | 3/2008 | Lin ...................... G08G 1/0104 340/933 |
| 2011/0227757 A1* | 9/2011 | Chen ................ G08G 1/096791 340/902 |

(Continued)

OTHER PUBLICATIONS

Rauch, A., "Entwicklung Von Methoden Für Die Fahrzeugübergreifende Umfelderfassung," Universität Ulm, Dissertation, 2016, pp. 1-270. English Abstract Begins on Unnumbered p. 7 of the Document.
(Continued)

*Primary Examiner* — Hunter B Lonsberry
*Assistant Examiner* — Matthew J. Reda
(74) *Attorney, Agent, or Firm* — Norton Rose Fulbright US LLP; Gerard Messina (57) ABSTRACT

A method for fusing state data via a control unit. State data of a first mobile unit and of an object ascertained via a sensor system of the first mobile unit are received. State data of an object ascertained via a sensor system of a second mobile unit and/or state data of the second mobile unit, transmitted via a communication link from the second mobile unit to the first mobile unit, are received. A node is created in a time-position diagram for each set of received state data of the first mobile unit, the second mobile unit, and the objects. A data optimization of the state data ascertained by the first mobile unit and/or by the second mobile unit is carried out. An optimization problem is created based on the optimized state data ascertained by the first mobile unit and the optimized state data received from the second mobile unit.

11 Claims, 4 Drawing Sheets

(51) Int. Cl.
*G08G 1/00* (2006.01)
*B60W 60/00* (2020.01)

(52) U.S. Cl.
CPC .............. *G05D 1/028* (2013.01); *G08G 1/22* (2013.01); *B60W 2556/65* (2020.02); *G05D 2201/0213* (2013.01)

(58) Field of Classification Search
CPC ...... G05D 2201/0213; B60W 2554/00; B60W 2556/25; B60W 2556/35; B60W 2556/65; B60W 60/001
See application file for complete search history.

(56) References Cited

U.S. PATENT DOCUMENTS

2019/0212746 A1* 7/2019 Cheng ................. B60W 60/001
2019/0339082 A1* 11/2019 Doig ........................ G06F 16/29
2019/0367022 A1* 12/2019 Zhao ............... B60W 30/18154

OTHER PUBLICATIONS

Liu, H., et al., "Fusioneye: Perception Sharing for Connected Vehicles and Its Bandwidth-Accuracy Tradeoffs," In 16th International Conference on Sensing, Communication and Networking (SECON), 2019, pp. 1-9.
Nascimento, P. P. L. L. et al., "An Integrated Dead Reckoning With Cooperative Positioning Solution to Assist GPS NLOS Using Vehicular Communications," In: Sensors 18(9):2895, 2018, pp. 1-28.

* cited by examiner

GRAPH-BASED METHOD FOR THE HOLISTIC FUSION OF MEASURED DATA

CROSS REFERENCE

The present application claims the benefit under 35 U.S.C. § 119 of German Patent Application No. DE 102019217648.8 filed on Nov. 15, 2019, which is expressly incorporated herein by reference in its entirety.

FIELD

The present invention relates to a method for fusing state data, a method for redundantly carrying out a localization, a control unit and a computer program, as well as a machine-readable memory medium.

BACKGROUND INFORMATION

Vehicles and driver assistance systems operable in an automated manner may be improved upon if they expand the ego surroundings perception with the aid of received data and also take received pieces of information about the planned and desired behavior of other vehicles into account during the ego behavior and maneuver planning.

Concepts of a collective perception are available, which exchange warning messages or so-called "cooperative awareness messages" among one another and increase the traffic safety.

In addition, so-called "cooperative perception messages" are already available, which expand the surroundings perception and, in addition to the pieces of localization information and movement information of the transmitting vehicle, convey a list of the objects perceived by the latter. The respective messages are exchanged via V2X communication links between relevant road users. A highly accurate localization of the vehicles is necessary for exchanging cooperative perception messages, so that the receiving vehicles are able to implement a precise expansion of their surroundings models. The accuracy of the present surroundings models remains unchanged, however.

The respective vehicles communicating with one another are dependent, in particular, on the on-board surroundings sensor system for carrying out automated drives, in order to carry out a localization. If the onboard surroundings sensor system fails or is degraded, the automated driving mode may no longer be maintained.

SUMMARY

An object of the present invention includes providing a method for improving an accuracy and an availability of localization functions.

This object may achieved in accordance with example embodiments of the present invention. Advantageous embodiments of the present invention are described herein.

According to one aspect of the present invention, a method is provided for fusing state data via a control unit.

In accordance with an example embodiment of the present invention, in one step, state data of a first mobile unit and state data of at least one object ascertained via a sensor system of the first mobile unit are received.

State data of at least one object ascertained via a sensor system of the second mobile unit and/or state data of the at least one second mobile unit, transmitted via a communication link from at least one second mobile unit to the first mobile unit, are received. The at least one object in this case may be a stationary or static or a dynamic object. The object may, for example, be a road user such as for example a vehicle, a motorcycle, a bicyclist and the like.

In a further step, a node is created in a time-position diagram for each set of received state data of the at least one first mobile unit, of the at least one second mobile unit and of the objects. The respective object-specific or vehicle-specific nodes differing temporally from one another may be connected to one another.

A data optimization of the state data ascertained by the first mobile unit and/or of the state data ascertained by the second mobile unit is carried out in a further step.

An optimization problem is created based on the optimized state data ascertained by the first mobile unit and the optimized state data received from the second mobile unit. The optimization problem is solved via a solution algorithm. The solution algorithm used may be, for example, so-called preconditioned conjugate gradient solvers, sparse direct linear solvers, and the like.

In a further step, state data of the first mobile unit and state data of the at least one object ascertained by the sensor system of the first mobile unit are subsequently ascertained with an increased accuracy compared to the state data of the first mobile unit. For this purpose, the optimization problem may be formulated and solved based on data or nodes optimized via the data optimization.

According to another aspect of the present invention, a control unit is provided, the control unit being configured to carry out the method. The control unit may, for example, be a vehicle-external control unit or a vehicle-external server unit such as, for example, a cloud system.

According to one aspect of the present invention, a computer program is also provided, which includes commands which, when the computer program is executed by a computer or a control unit, prompt the computer to carry out the method according to the present invention. According to a further aspect of the present invention, a machine-readable memory medium is provided, on which the computer program according to the present invention is stored.

The at least one first mobile unit and the at least one second mobile unit in this case may be operable according to the BASt standard in a semi-automated, highly-automated and/or fully-automated or driverless manner.

The control unit may be situated in at least one of the mobile units. The mobile unit may, for example, be designed as a vehicle, a robot, a drone, a watercraft, a rail vehicle, a robotaxi, an industrial robot, a commercial vehicle, a bus, an aircraft, a helicopter, and the like.

The first mobile unit may be designed as a receiver and/or as a transmitter of pieces of state information depending on the development of the method. Alternatively or in addition, the second mobile unit may be designed as a receiver and/or as a transmitter of pieces of state information. In this case, the mobile units may be designed simultaneously as transmitter and receiver.

The state data in this case may include data of a localization such as, for example, location, velocity, acceleration, driving direction, relative distances and interspaces, measured dimensions and the like.

With the aid of the example method, it is possible to carry out a fusion of onboard data with received data in order to optimize the localization resulting from the onboard data. The onboard data in this case are the state data, which the first mobile unit itself ascertains via its sensor system and may contain data about objects in the surroundings of the first mobile unit.

The received data are all state data received via the communication link by the first mobile unit or a control unit situated in the first mobile unit, which are ascertained by the at least one second mobile unit.

The fusion of the state data is carried out by the method in such a way that an improvement of the state estimation of the first mobile unit using the data received via the communication link takes place and a highly accurate relative localization of the objects or of the mobile units in the relevant surroundings of the first mobile unit is achieved.

The example method may thus be used, for example, within the scope of a fusion algorithm for creating a surroundings model for vehicles or moving objects, which is able to fuse localization data or state data, as well as data relating to perceived objects from the onboard sensor system and data from cooperative perception messages and cooperative perception messages. With the aid of the method, it is possible to implement, in particular, a holistic fusion for improving the ego-localization or the estimation of the ego state of the first mobile unit, as well as an exact relative localization of the objects ascertained in the surroundings model of the first mobile unit.

According to one exemplary embodiment of the present invention, the data optimization is carried out via an iterative minimization of an accumulated distance between positions of objects ascertained by the sensor system of the first mobile unit and the objects ascertained by the sensor system of the second mobile unit. In this way, a data association of received state data may be provided which, in contrast to known methods, does not consider the measurements individually, but assesses the entire scene or traffic situation and carries out a registration based on all objects and in this way solves the association problem. In the process, ambiguities are resolved, which arise, however, only by considering each individual object alone. In order not to even be able to allow such ambiguities to arise in the first place, the association of the onboard measurements via the objects perceived by the first mobile unit and of the object measurements transmitted by the second mobile unit with the objects stored in the surroundings model of the first mobile unit takes place via a so-called ICP (iterative closest point)-like method.

According to one further specific embodiment of the present invention, an ego position of the first mobile unit, an ego position of the second mobile unit, a position of the at least one object and/or pieces of relative distance information between the first mobile unit, the second mobile unit and the at least one object are ascertained from the received state data of the first mobile unit and from the received state data of the second mobile unit, an ego position of the first mobile unit within a surroundings model being created from the received state data of the first mobile unit and the received state data of the second mobile unit. In this way, it is possible to create an ego position of the first mobile unit with increased accuracy within the surroundings model. The optimization of the accuracy of the ego position takes place via the data optimization of the received state data, which subsequently serve as the basis for a renewed and more precise calculation of the ego position of the first mobile unit.

According to one further exemplary embodiment of the present invention, the received state data having an age or a time stamp above a statically or dynamically adjustable threshold value are discarded. In this way all nodes from the instantaneous time-position diagram that are older than a particular threshold value may be discarded with each new measurement. This threshold value is a parameter, which may be selected depending on the available computing capacity and the number of objects. The threshold value is not necessarily constant, but may vary from point in time to point in time.

According to one further specific embodiment of the present invention, the optimization problem is formulated and solved after receiving state data, at regular intervals or initiated by the control unit when needed from the nodes entered in the time-position diagram and optimized via the data optimization. With this measure, it is not absolutely necessary to have to solve the optimization problem with each new measurement. The time-position diagram may be expanded with each measurement but solved only when this is required such as, for example, at scanning points in time of the control unit, which carries out the situation analysis or the method.

In addition, state data arriving or received with a delay may be handled in this way. This is possible with no additional technical effort in that nodes are inserted into the graph or the time-position diagram at corresponding points in time and the graph is expanded via connections between existing nodes and the new nodes. It is not absolutely necessary immediately to discard nodes or the ascertained state data that are older than the threshold value. Instead, it is possible to have the previously calculated value incorporated as prior information into the optimization problem.

According to one further aspect of the present invention, a method is provided for redundantly carrying out a localization via a control unit. In accordance with an example embodiment of the present invention, in one step, measured data ascertained via a sensor system of at least one first mobile unit are received by at least one second mobile unit in the surroundings of the first mobile unit. A relative position of the second mobile unit with respect to the first mobile unit is ascertained from the received measured data.

In one further step, measured data of the first mobile unit ascertained via a sensor system of the at least one second mobile unit and/or a position of the second mobile unit are received via a communication link.

A position of the first mobile unit based on the ascertained relative position of the second mobile unit is subsequently ascertained based on the measured data and/or on the position of the second mobile unit, which are received via the communication link.

With the aid of the method, it is possible for the mobile units to exchange measured data among one another and in the process increase the total performance of the respective localization functions. The accuracy of the localization may, in particular, be improved upon or a redundant ascertainment of the ego position may be performed based on received measured data.

The communication link between the at least one first mobile unit and the at least one second mobile unit may, for example, be designed as a V2V (vehicle-to-vehicle) link.

Mobile units operable in an automated manner are normally able to detect nearby objects and mobile units and are able to determine the relative position of the objects or of the mobile units. If the relative position of the objects or of the second mobile unit with respect to the first mobile unit is known, then the self-determined ego positions of the first mobile unit and of the second mobile unit may be exchanged among one another in order to increase the accuracy of the calculated ego positions or to provide a redundancy of the localization.

Such an approach is advantageous, since the first mobile unit is able to ascertain an ego position, even in the event of a failure of the sensor system. The extraneously ascertained ego position of the second mobile unit and a known position of the first mobile unit may be utilized in this case.

By fusing the measured data ascertained by the first mobile unit with measured data received from the second mobile unit via the communication link, it is possible to increase the accuracy of the ascertained ego position of the first mobile unit and/or of the second mobile unit.

In addition, the method may be used in a convoy for the purpose of equipping a portion of the convoy participants with an affordable sensor system and to profit from a few convoy participants having a more advanced sensor system. Since a distance measurement relative to a convoy participant, which ascertains a precise ego position, is sufficient, it is possible to carry out an automated convoy trip using technically simpler means.

The control unit may enable the identification of nearby mobile units and a joint exchange of measured data. Each mobile unit is able to ascertain an ego position and a relative position of the respectively other mobile unit preferably based on the respective sensor system. Further measured data received via the communication link may be used for optimizing the accuracy based on the respective ego position and on the relative position.

In one first embodiment of the method in accordance with the present invention, the second mobile unit may determine an ego position and transmit this ego position to the first mobile unit. The ego position of the second mobile unit may be utilized by the first mobile unit for calculating an ego position using the knowledge of the distance of the first mobile unit from the second mobile unit. The advantage of this variant is that the use and the transmission of the ascertained ego positions are technically simple. Moreover, the required bandwidth of the communication link may be minimized.

One second embodiment of the method in accordance with the present invention includes the transmission of arbitrary measured data to the first mobile unit, which was ascertained by the second mobile unit. This takes place alternatively or in addition to a transmission of ego positions. In this way, large amounts of measured data may be transmitted and a particularly precise surroundings perception based on extraneously ascertained measured data may be provided.

According to one further exemplary embodiment of the present invention, the position of the first mobile unit is ascertained from the measured data received via the communication link and/or from the position of the second mobile unit in addition to or instead of a position calculated by the first mobile unit. In this way, it is possible to use the received measured data and/or positions of the second mobile unit as a redundancy of the ego sensor system of the first mobile unit. It is thus possible to compensate for a sensor failure or a degradation of the sensors of the first mobile unit. In this way, it is possible, in particular, to implement a fallback solution for increasing the traffic safety.

According to one further specific embodiment of the present invention, the position of the first mobile unit is calculated with an increased accuracy based on the measured data received via the communication link and/or on the position of the second mobile unit in connection with the measured data ascertained by the sensor system of the first mobile unit. With this measure, it is possible to fuse the received extraneously ascertained measured data with the self-ascertained measured data of the first mobile unit for the purpose of increasing the accuracy of the ego localization. The accuracy of the localization of the first mobile unit is, in particular, increased with respect to the original state data or the self-ascertained localization data of the first mobile unit.

According to one further exemplary embodiment of the present invention, the measured data received via the communication link and/or position of the second mobile unit are fused by a method according to the present invention for fusing state data with the measured data ascertained by the sensor system of the first mobile unit.

BRIEF DESCRIPTION OF THE DRAWINGS

Preferred exemplary embodiments of the present invention are explained in greater detail below with reference to highly simplified schematic representations.

DETAILED DESCRIPTION OF EXAMPLE EMBODIMENTS

Figure 1:
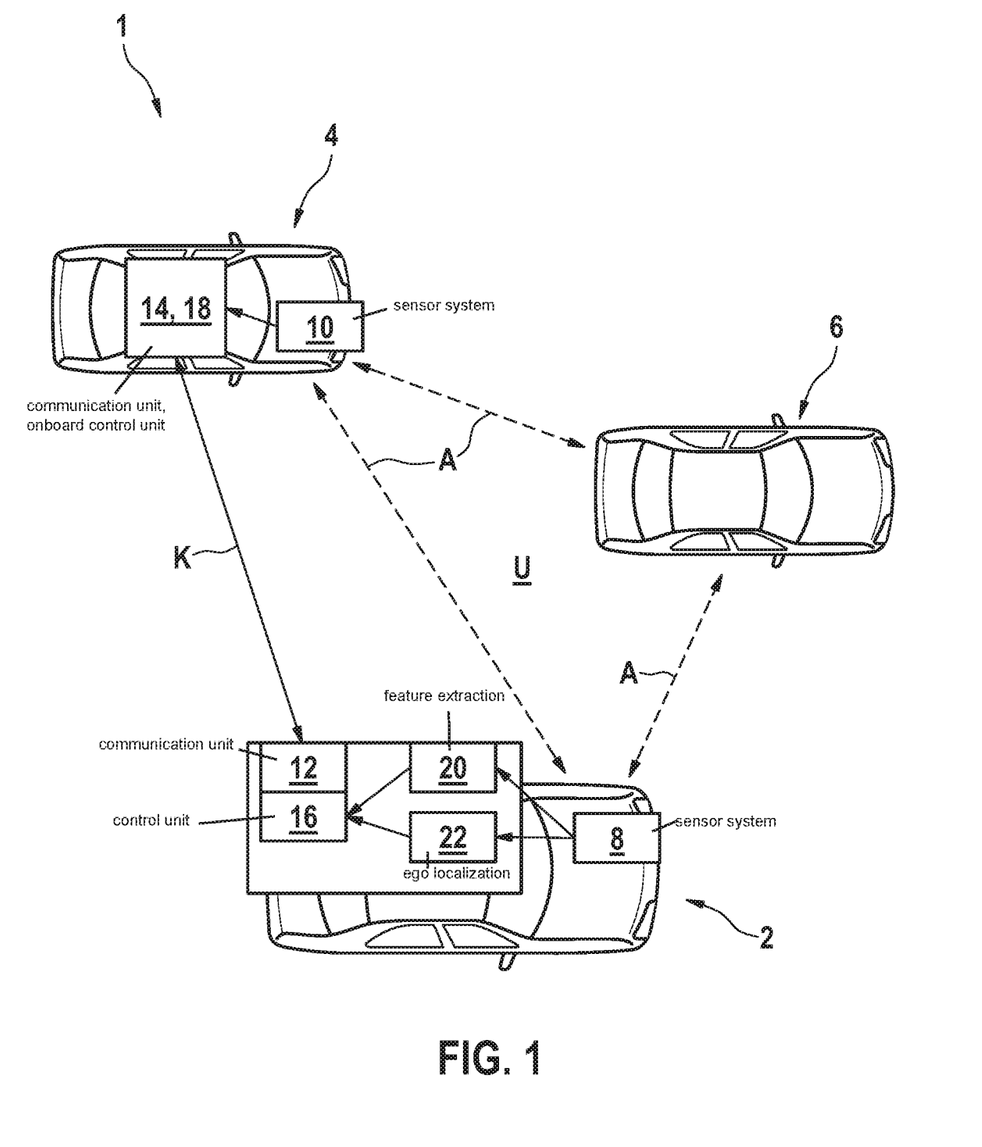
FIG. 1 shows a top view of a traffic situation illustrating a method for redundantly carrying out a localization according to one specific embodiment of the present invention.

FIG. 1 shows a top view of a traffic situation 1 for illustrating a method for redundantly carrying out a localization according to one specific embodiment of the present invention.

Traffic situation 1 includes a first mobile unit 2 and a second mobile unit 4. In addition, a dynamic object 6, which is designed as a vehicle, is situated in surroundings U of first mobile unit 2 and of second mobile unit 4.

First mobile unit 2 and second mobile unit 4 are designed as motor vehicles and may be operated in an automated manner. For this purpose, first mobile unit 2 and second mobile unit 4 each include a sensor system 8, 10. Sensor system 8, 10 may, for example, include radar sensors, GNSS sensors, camera sensors, LIDAR sensors, and the like.

Via sensor system 8, 10, it is possible to scan surroundings U and, for example, to detect object 6. In addition, mobile units 2, 4 may be mutually detected.

In the illustrated exemplary embodiment, first mobile unit 2 is designed as a receiver and second mobile unit 4 is designed as a transmitter. Second mobile unit 4 may, in particular, transmit measured data ascertained by its sensor system 10 via a communication link K to first mobile unit 2. The transmitted measured data may, for example, include a position of second mobile unit 4 and/or relative positions. The relative position may, for example, be a distance A between second mobile unit 4 and first mobile unit 2, as well as between second mobile unit 4 and object 6, which is measured by sensor system 10.

First mobile unit 2 may calculate its own position with the aid of the position of second mobile unit 4 received via communication link K and of relative positions A.

To establish communication link K, mobile units 2, 4 include communication units 12, 14. Communication units 12, 14 are linked to respective onboard control units 16, 18 in a data-transmitting manner.

Control unit 16 of first mobile unit 2 is able to receive and evaluate the measured data of sensor system 8 and transmit these or receive extraneously ascertained measured data via communication unit 12 via communication link K. Similarly, control unit 18 of second mobile unit 4 is able to receive and evaluate the measured data of sensor system 10.

Control unit 16, 18 may ascertain a feature extraction 20, an ego localization 22 and nearby vehicles and objects 6 from the measured data of sensor system 8, 10.

First mobile unit 2 in this case may also be designed as a transmitter and second mobile unit 4 may be designed as a receiver. Multiple first mobile units 2 and multiple second mobile units 4 may also be provided.

Figure 2:
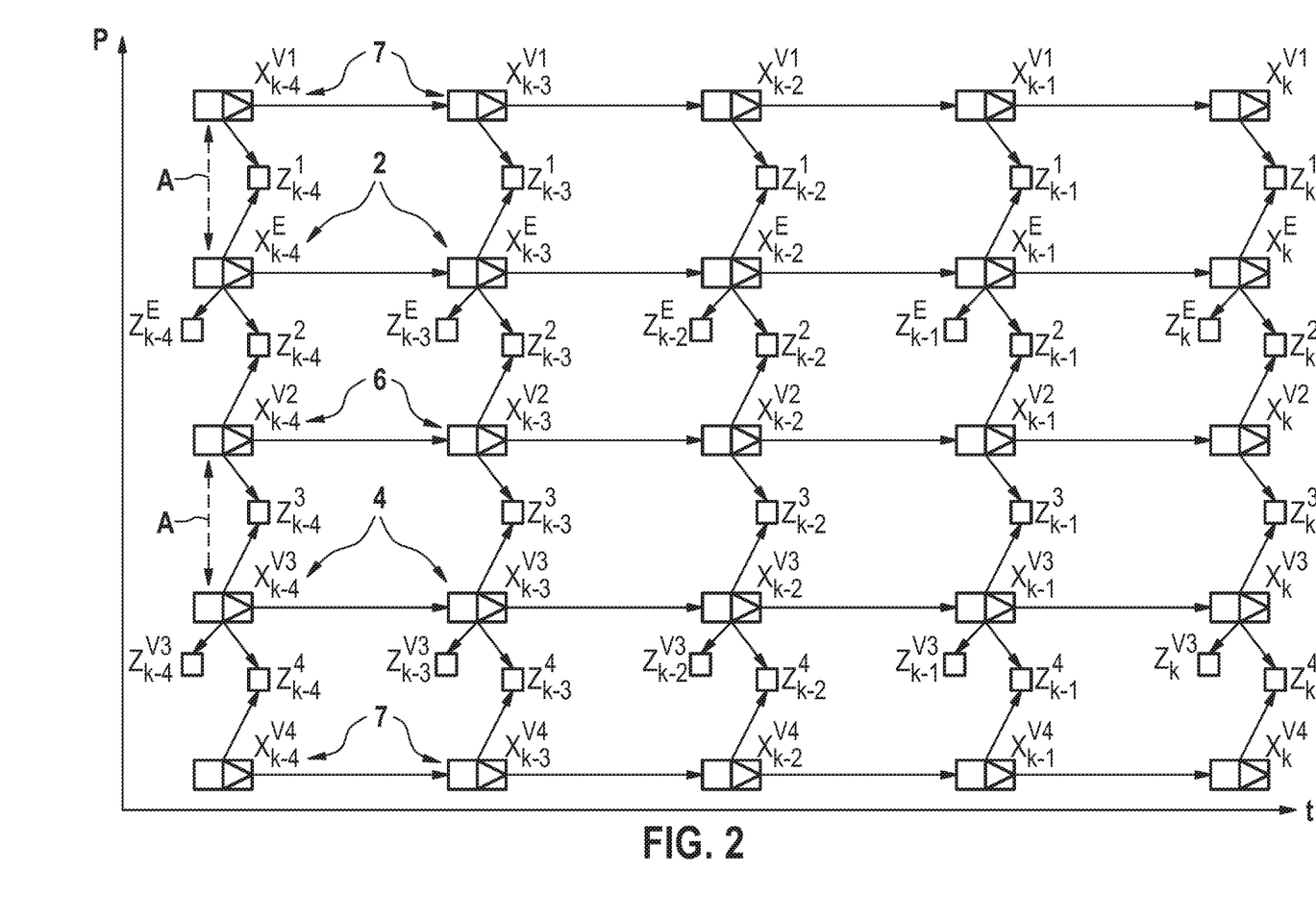
FIG. 2 schematically shows a representation of a time-position diagram illustrating a method for fusing state data, in accordance with an example embodiment of the present invention.

FIG. 2 schematically shows a representation of a time-position diagram for illustrating a method for fusing state data. First mobile unit 2, second mobile unit 4 and three objects 6, 7 are represented, which are ascertained and entered in the diagram as a function of time t or the point in time of the measurement and of the relative position A. Each measurement is stored in the form of a node in the diagram and connected to older nodes. This forms a probabilistic graphic model, which may be formulated as an optimization problem and solved via a solver.

In the time-position diagram, $X^E_K$ represents nodes of ascertained positions of first mobile unit 2 including corresponding state data $Z^E_K$ at point in time k. $X^{V1-4}_K$ form the nodes of tracked objects 4, 6 including the ascertained state data $Z^{V1-4}_K$ at point in time k, node $X^{V3}_K$ mapping the position of second mobile unit 4 with state data $Z^{V3}_K$ ascertained by second mobile unit 4. Node $X^{V2}_K$ is detected and tracked by both mobile units 2, 4 and is dynamic object 6 from FIG. 1, for example.

In a classic state estimation or localization, the object is to estimate the profile of the system state such as, for example, a position, an orientation, a velocity, an acceleration of a mobile unit 2, 4 from provided measurements of sensor system 8, 10. This is necessary because, on the one hand, the measurements are inexact and noisy and, on the other hand, some of the state variables are not directly observable and therefore must be derived. For example, the global position of a mobile unit 2, 4 without a GPS signal must be estimated based on its velocity data and acceleration data. If mobile unit 2, 4 has a sensor system 8, 10 for identifying objects 6, 7 in surroundings U, then the states of these objects 6 may also be tracked beyond time t. Moreover, objects 6, 7 may be temporarily invisible as a result of a missing detection or a temporary occlusion of sensor system 8, 10 and thus are compensated for by tracking.

An estimation of the state data by tracking detected objects 6, 7 or so-called interference may take place for the ego state data of first mobile unit 2 with the aid of a recursive filter such as, for example, an extended Kalman filter, an unscented Kalman filter or a particle filter. In this case, a multi-target tracking for multiple objects 4, 6, 7 may also be implemented.

For a simple case, in which merely first mobile unit 2, E with a detected object 7, V1 is considered, the probability density p may be calculated via the following equation.

$$p(x^E_{0:k}, x^{V1}_{0:k} | z^E_{1:k}, z^1_{1:k}) =$$

$$\frac{1}{c} p(x^E_0) p(x^{V1}_0) \prod_{t=1}^{k} p(z^1_t | x^{V1}_t, x^E_t) p(x^{V1}_t | x^{V1}_{t-1}) p(z^E_t | x^E_t) p(x^E_t | x^E_{t-1})$$

In this locally ascertained probability density p, the density of the ego state of mobile unit 2 is independent from the density of the state of the vehicle or object 7, but not vice versa. Probability density p in this case need not necessarily be calculated for an entire time period or observation time period of t=0 . . . k.

If, in addition to the self-ascertained state data from sensor system 8, first mobile unit 2 then receives state data and/or sensor date via V2X communication link K from further vehicles 4, the estimation problem and the calculation of probability density p become more complicated, since it may be possible that the received state data enable conclusions to be drawn about the ego state of first mobile unit 2. Such a scenario is schematically represented in FIG. 2.

In this representation, second mobile unit 4, V3 transmits measurements of ego state $Z^{V3}_K$ in the form of cooperative awareness messages and measurements of state data $Z^{V4}_K$ of vehicle V4 detected by it in the form of cooperative perception messages.

First mobile unit 2 or the exemplary ego vehicle receives the cooperative awareness messages and the cooperative perception messages and detects further objects V2 and V1 with sensor system 8 and has measurements of its state $Z^E_K$.

Since first mobile unit 2, E and second mobile unit 4, V3 both detect object 6, V2 and second mobile unit 4, V3 transmits state data $Z^{V3}_K$, $Z^{V4}_K$ of its sensor system 10 to first mobile unit 2, E, the estimation of state $Z^E_K$ is no longer a function exclusively of the ego measurements of first mobile unit 2, E, but also of measurements $Z^{V3}_K$, $Z^{V4}_K$ of second mobile unit 4, V3 and vice versa. This means that probability density p of ego state $Z^E_K$ is a function of probability density p of state $Z^{V3}_K$ of second mobile unit 4, V3 and vice versa.

This mutual dependency means that the classic multi-target tracker application requires approximations for simplifying. This approximation may be implemented via a graph-based approach.

The approach may, for example, be described as follows:
  With each new measurement, all nodes $X^{E,V}_K$ that are older than a particular threshold value are discarded from the instantaneous time-position diagram. This threshold value is a parameter, which may, for example, be selected as a function of an available computing capacity and of the number of objects 6, 7. In addition, the threshold value may be variable and thus may temporally vary.
  For each new measurement, a new node $X^{E,V}_K$ for received objects 2, 4, 6, 7 is inserted into the graph so that time stamp k of inserted object node $X^{E,V}_K$ corresponds to point in time t of the measurement.
  In a further step, an optimization problem is constructed made up of a quadratic matrix and a vector. This takes place using algorithmic adaptations based on the use of data of moved objects 2, 4, 6, 7.
  The optimization problem is subsequently solved using a suitable solver or a solution algorithm.
  The solution of the optimization problem is efficiently possible, even for high-dimensional optimization problems due to the exploitation of the sparsity of the optimization problem.

Moreover, it is not absolutely necessary to have to solve the optimization problem with each new measurement. The time-position diagram may be expanded with each measurement, but solved only when this is required. This may, for example, take place at scanning points in time of control unit 16, 18, which carries out a situation analysis.

The method is also able to handle delayed data. This is possible with the method according to the present invention without additional effort in that nodes X are inserted at corresponding points in times k into the time-position diagram and the time-position diagram is expanded via connections between existing nodes X and these new nodes X. The time-position diagram may thus serve as a buffer for state data and the like. Finally, it is not absolutely necessary immediately to discard nodes X that are older than the threshold value. Instead, it is possible to incorporate the previously calculated node X as prior information into the optimization problem.

Figure 3:
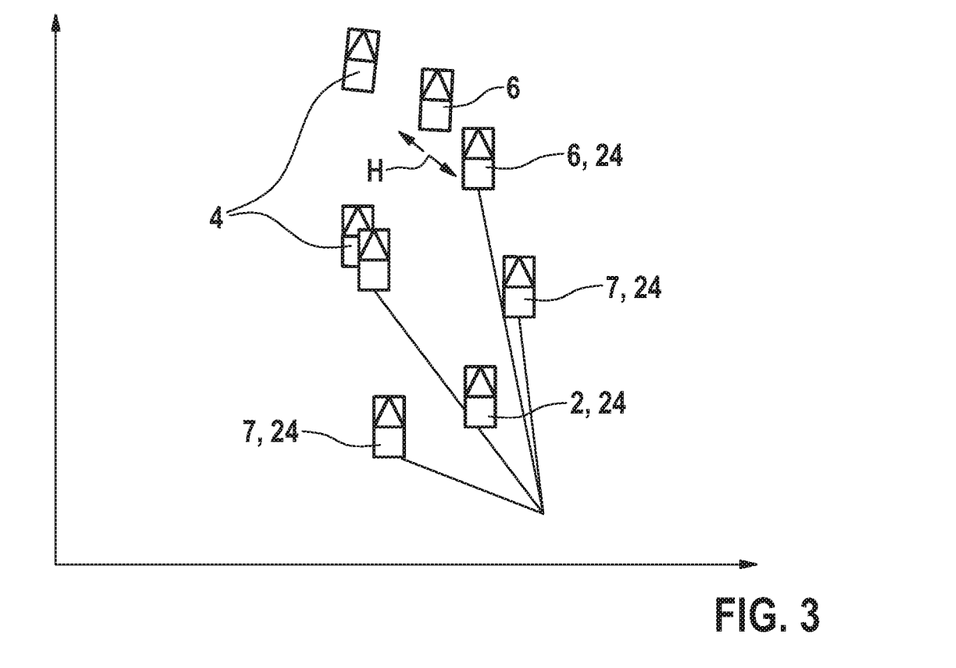
FIG. 3 shows a top view of a surroundings model having a localization inaccuracy, in accordance with an example embodiment of the present invention.

FIG. 3 shows a top view of a surroundings model that includes a localization inaccuracy. For example, the measurements described in FIG. 2 and received via communication link K exhibit a localization inaccuracy. The localization inaccuracy is, for example, illustrated by erroneously oriented positions of second mobile unit 4.

To correctly set up the graph-based optimization problem described in FIG. 2, a correct data association must be carried out beforehand. In the process, the object measurements from ego sensor system 8 of first mobile unit 2 and the object measurements that have been received via communication link K are implemented in a surroundings model and correctly assigned to objects 24 in the surroundings model.

To carry out a data optimization, an association of onboard measurements of first mobile unit 2 of perceived objects 4, 6, 7 and the object measurements received via communication link K are used via an ICP (iterative closest point)-like method.

In one step, the state data or the object measurement of detected objects 4, 6, 7 as well as measuring object 2, which have been ascertained by sensor system 8 of first mobile unit 2 and/or by sensor system 10 of second mobile unit 2, are transformed into a coordinate system of the surroundings model.

Figure 4:
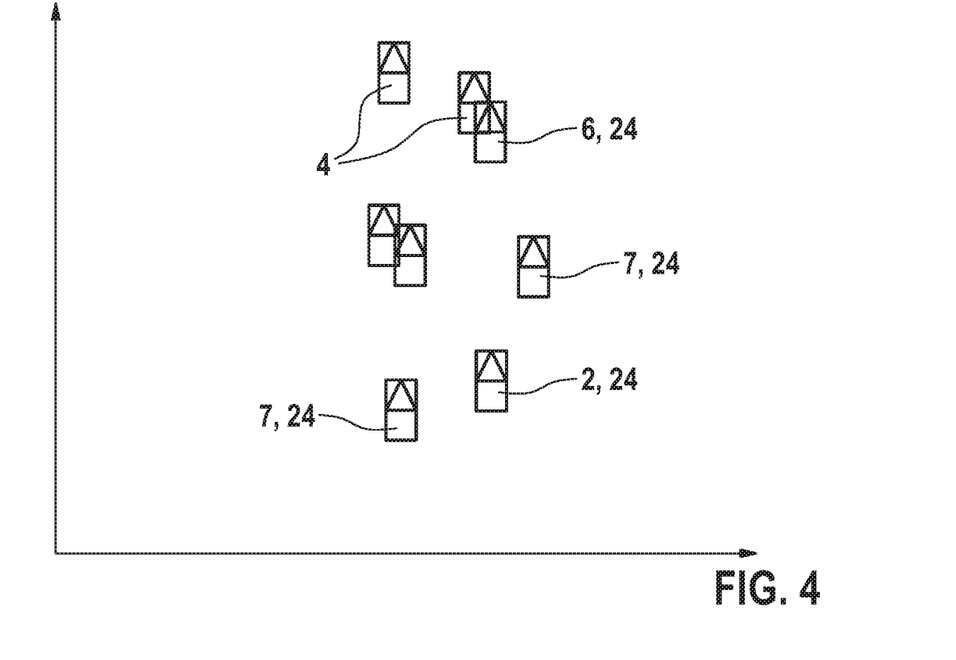
FIG. 4 shows a top view of the surroundings model from FIG. 3 after an implemented data optimization, in accordance with an example embodiment of the present invention.

The entire measurement is iteratively shifted in such a way that a minimum for an accumulated distance H between objects 2, 4, 6, 7 in the measurement and objects 24 in the surroundings model is achieved. This process is illustrated in FIG. 4.

Figure 5:
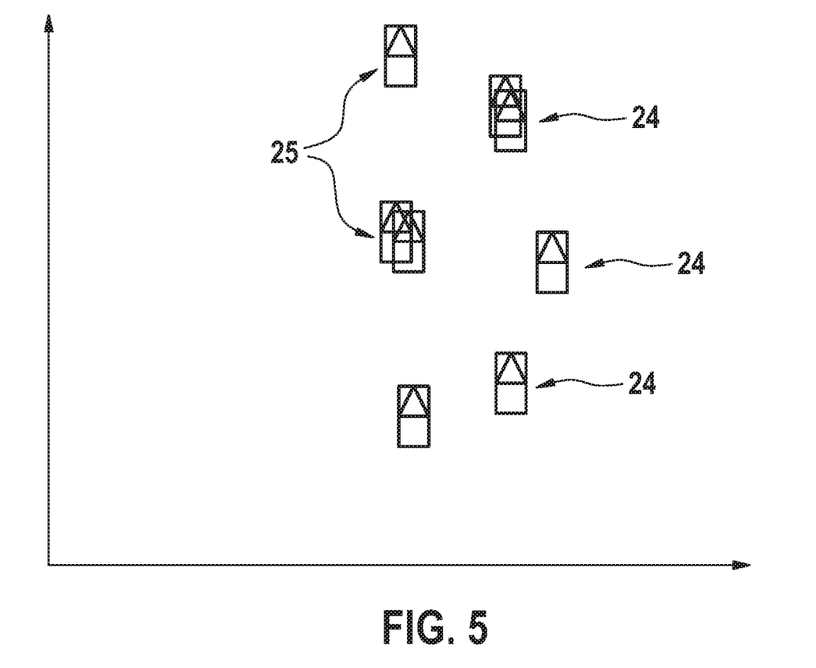
FIG. 5 shows a top view of a surroundings model recalculated after the data optimization, in accordance with an example embodiment of the present invention.

As a result of the data optimization, a newly calculated surroundings model is formed, which is depicted in FIG. 5. Within the scope of the fusion, the state of vehicles 24, with which one measurement each has been associated, has been updated and applied as new objects 25 in the surroundings model.

The surroundings model is subsequently used as the basis for formulating or setting up an optimization problem, which may be handled similarly to a SLAM problem, the optimization problem taking dynamic objects 24, 25 and non-static landmarks into account. In this way, a graph-based approach may also be provided with exclusively dynamic objects.

What is claimed is:

1. A method of a first vehicle, the method comprising:
obtaining, by a control unit of the first vehicle and using a sensor system of the first vehicle, a dataset including first state data that includes state data of the first vehicle and state data of at least one object detected by the sensor system of the first vehicle;
receiving, by the control unit, a dataset including second state data ascertained by a second vehicle, the second state data including: state data of at least one object ascertained via a sensor system of the second vehicle, the second state data being transmitted via a communication link from the second vehicle to the first vehicle;
creating, by the control unit, a respective one of a plurality of nodes in a time-position diagram for each of the datasets;
carrying out, by the control unit, a data optimization of the first state data and of second the state data; and
executing, by the control unit, an autonomous driving of the first vehicle based on the data optimization of the first state data and the second state data;
wherein:
that of the first and second state data that is respectively associated with a timestamp indicating a respective age that is above a threshold age value is removed from the time-position diagram; and
the threshold age value is varied over time depending on a number of objects of the time-position diagram or depending on an available computing capacity.

2. The method as recited in claim 1, wherein the position of the first vehicle, and/or an ego position of the second vehicle, and/or the position of the at least one object ascertained via the sensor system of the first vehicle, and/or the position of the at least one object ascertained via the sensor system of the second vehicle, and/or pieces of relative distance information between the first vehicle, the second vehicle, and the at least one object, are ascertained from the first state data of the first vehicle and from the second state data of the second vehicle, the position of the first vehicle being created within the surroundings model based on the first state data and the second state data.

3. The method as recited in claim 1, wherein the optimization problem is created and solved each time further state data is received or at regular time intervals or in response to predefined events.

4. The method as recited in claim 1, wherein each of the nodes of the time-position diagram includes an identification of a respective object location and an identification of a respective object state.

5. The method as recited in claim 1, wherein the data optimization includes generating a model of positions of the at least one object and gradually modifying the positions of the model by an iterative minimization of an accumulated distance between (1) positions of all of the at least one object in the model and (2) a combination of positions of all of the at least one object respectively detected by the first vehicle and by the second vehicle.

6. The method as recited in claim 1, wherein the data optimization increases an accuracy of a position of the first vehicle used by the control unit of the first vehicle for the autonomous driving.

7. The method as recited in claim 1, wherein the varying over time of the threshold age value depends on the number of objects of the time-position diagram.

8. The method as recited in claim 1, wherein the varying over time of the threshold age value depends on the available computing capacity.

9. The method as recited in claim 1, further comprising:
creating, by the control unit, an optimization problem based on the optimized first state data and based on the optimized second state data; and solving, by the control unit, the optimization problem via a solution algorithm that increases an accuracy of the first state data and the second state data, wherein the execution of the autonomous driving is performed based on the first and second state data with the increased accuracy.

10. A control unit of a first vehicle, the control unit configured to:
   obtain, using a sensor system of the first vehicle, a dataset including first state data that includes state data of the first vehicle and state data of at least one object detected by the sensor system of the first vehicle;
   receive a dataset including second state data ascertained by a second vehicle, the second state data including: state data of at least one object ascertained via a sensor system of the second vehicle, the second state data being transmitted via a communication link from the second vehicle to the first vehicle;
   create a respective one of a plurality of nodes in a time-position diagram for each of the datasets;
   carry out a data optimization of the first state data and of second the state data; and
   execute an autonomous driving of the first vehicle based on the data optimization of the first state data and the second state data;
   wherein:
      that of the first and second state data that is respectively associated with a timestamp indicating a respective age that is above a threshold age value is removed from the time-position diagram; and
      the threshold age value is varied over time depending on a number of objects of the time-position diagram or depending on an available computing capacity.

11. A non-transitory machine-readable memory medium on which is stored a computer program for a control unit of a first vehicle, the computer program being executable by a computer of the control unit and causing the computer, when executing the computer program, to perform the following steps:
   obtaining, using a second system of the first vehicle, a dataset including first state data that includes state data of the first vehicle and state data of at least one object detected by the sensor system of the first vehicle;
   receiving a dataset including second state data ascertained by a second vehicle, the second state data including: state data of at least one object ascertained via a sensor system of the second vehicle, the second state data being transmitted via a communication link from the second vehicle to the first vehicle;
   creating a respective one of a plurality of nodes in a time-position diagram for each of the datasets;
   carrying out a data optimization of the first state data and of second the state data; and
   executing an autonomous driving of the first vehicle based on the data optimization of the first state data and the second state data;
   wherein:
      that of the first and second state data that is respectively associated with a timestamp indicating a respective age that is above a threshold age value is removed from the time-position diagram; and
      the threshold age value is varied over time depending on a number of objects of the time-position diagram or depending on an available computing capacity.

* * * * *